US008873030B2

(12) United States Patent
Huang et al.

(10) Patent No.: US 8,873,030 B2
(45) Date of Patent: Oct. 28, 2014

(54) TESTING DEVICE, DETECTION SYSTEM, AND AUTOMATIC DETECTION METHOD THEREOF

(71) Applicant: Wistron Corporation, New Taipei (TW)

(72) Inventors: Po-Liang Huang, New Taipei (TW); Yu-Yen Chen, New Taipei (TW); Lin-Husng Chang, New Taipei (TW); Chia-Jui Liu, New Taipei (TW); Kai-Chung Cheng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/852,774

(22) Filed: Mar. 28, 2013

(65) Prior Publication Data

US 2013/0286384 A1    Oct. 31, 2013

(30) Foreign Application Priority Data

Apr. 27, 2012   (TW) .............. 101115201 A (51) Int. Cl.
| | |
|---|---|
| *G01D 18/00* | (2006.01) |
| *G01J 1/00* | (2006.01) |
| *G06F 3/041* | (2006.01) |
| *G01M 99/00* | (2011.01) |
| *G06F 3/042* | (2006.01) |

(52) U.S. Cl.
CPC . *G01D 18/00* (2013.01); *G01J 1/00* (2013.01); *G06F 3/0418* (2013.01); *G01M 99/008* (2013.01); *G06F 3/042* (2013.01)
USPC ....................................... 356/213

(58) Field of Classification Search
CPC ......... G01D 18/00; G01J 1/00; G06F 3/0418; G06F 3/042; G01M 99/008
USPC .......... 356/231–236, 601–614; 378/197, 114, 378/115; 348/125
See application file for complete search history.

(56) References Cited

U.S. PATENT DOCUMENTS

| | | | | |
|---|---|---|---|---|
| 4,955,011 | A * | 9/1990 | Baba | 369/53.25 |
| 5,097,327 | A * | 3/1992 | Hasebe | 348/25 |
| 7,616,329 | B2 * | 11/2009 | Villar et al. | 356/625 |
| 2003/0006973 | A1 | 1/2003 | Omura et al. | |
| 2004/0088891 | A1 * | 5/2004 | Theurer et al. | 37/198 |

(Continued)

FOREIGN PATENT DOCUMENTS

JP    2000105671 A    4/2000

*Primary Examiner* — Sang Nguyen
(74) *Attorney, Agent, or Firm* — Muncy, Geissler, Olds & Lowe, P.C.

(57) ABSTRACT

A testing device, a detection system, and an automatic detection method thereof are disclosed. The detection system is used for testing an optical capturing module and includes a controlling module and the testing device. The controlling module is electrically connected to the optical capturing module. The testing device includes a base, a fixing unit, a testing unit and a track. The fixing unit is disposed on the base and used for mounting the optical capturing module. The testing unit is used for the optical capturing module to capture a sensing signal. The track is disposed on the base for the testing unit to move along the track. When the testing unit is moving, the optical capturing module is use for capturing a sensing signal curve according to the continuous movement of the test element and the control module determines whether the sensing signal curve is exceed a predetermined value.

20 Claims, 7 Drawing Sheets

(56) References Cited

U.S. PATENT DOCUMENTS

| | | | |
|---|---|---|---|
| 2005/0031087 A1* | 2/2005 | Maschke | 378/196 |
| 2010/0007551 A1* | 1/2010 | Pagliuco et al. | 342/357.08 |
| 2012/0192616 A1* | 8/2012 | Wang et al. | 73/9 |
| 2012/0249722 A1* | 10/2012 | Wang | 348/14.05 |
| 2013/0070083 A1* | 3/2013 | Snead | 348/125 |
| 2013/0191070 A1* | 7/2013 | Kainer et al. | 702/167 |

* cited by examiner

TESTING DEVICE, DETECTION SYSTEM, AND AUTOMATIC DETECTION METHOD THEREOF

BACKGROUND OF THE INVENTION

1. Field of the Invention

The present invention relates to a testing device, a detection system and an automatic detection method, and more particularly relates to a testing device, a detection system and an automatic detection method with a track to achieve testing objectives.

2. Description of the Related Art

With advancement of technology, the structure and actuation mechanism of an optical touching system is developed by a light generation module as a light source emitting light on an object to be recognized in a background field. When the object to be recognized reflects the light, an optical capturing module receives the reflected light and then generates an image sensing signal. Therefore, in the manufacturing process of such optical touching system, the signal strength and distribution for the optical capturing module to obtain is a critical parameter to determine the quality test of such optical touching system.

Figure 1:
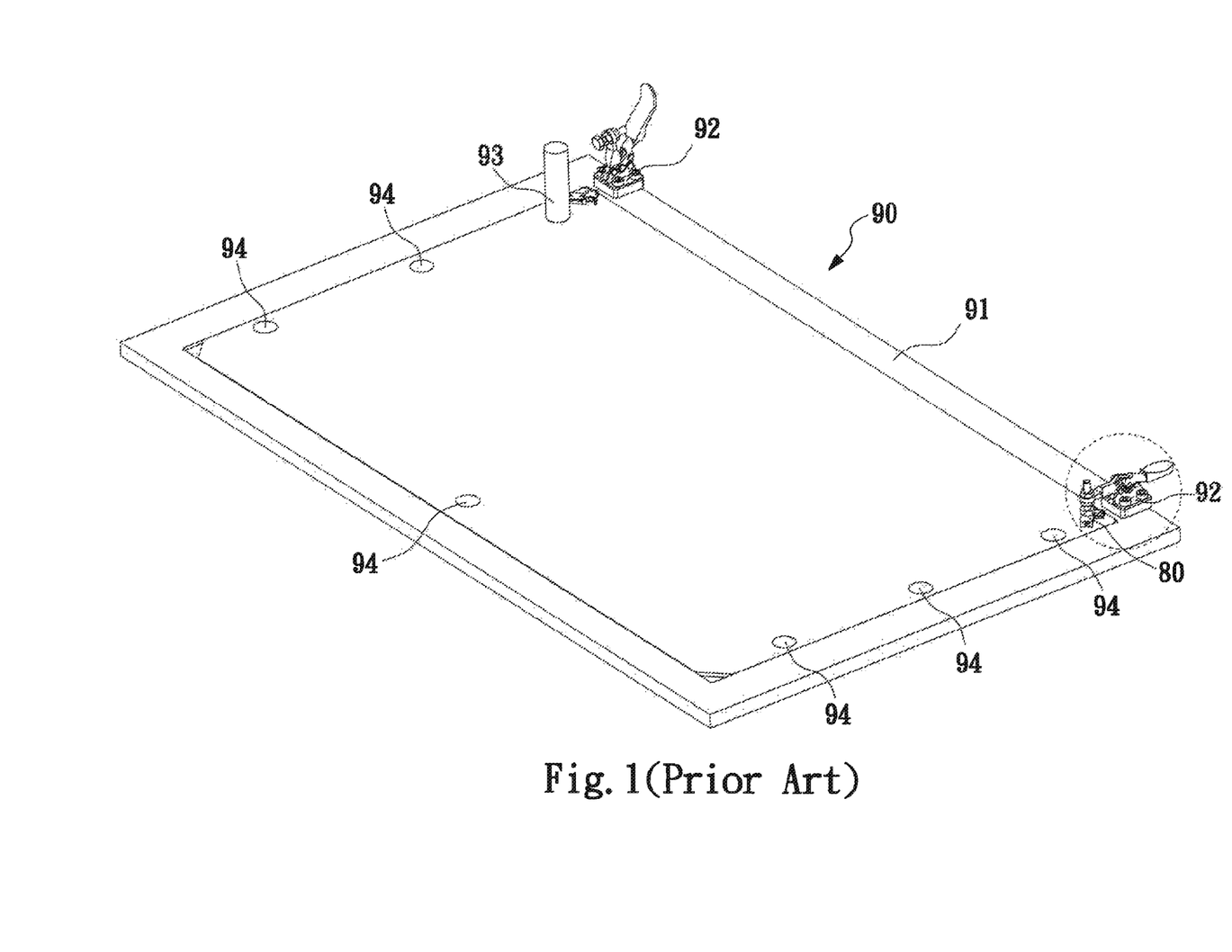
FIG. 1 is a structure diagram of a testing device of the prior art.
Figure 1A:
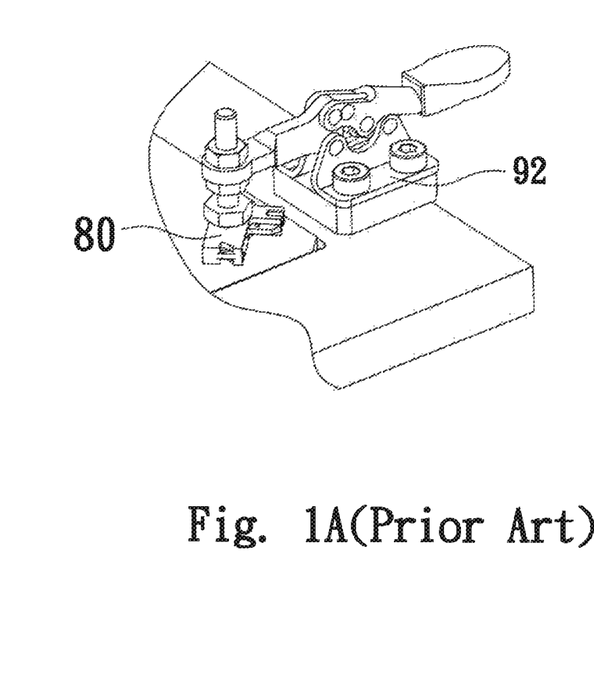
FIG. 1A is a structure diagram of an optical capturing module of the prior art.

Please refer to FIG. 1, which illustrates a structure of a testing device of the prior art and FIG. 1A is a structure diagram of an optical capturing module of the prior art.

In the prior art, the testing device 90 in FIG. 1 is used for testing the optical capturing module 80. The testing device 90 includes a base 91, two fixing units 92, a testing unit 93 and multiple positioning holes 94. The two fixing units 92 are disposed at the left and right corners of the upper lateral side of the base 91 for separately mounting the optical capturing modules 80 in the left corner and the right corner of the optical touching panel. The testing unit 93 is a cylinder object that simulates human fingers for the optical capturing module 80 to capture its reflected image to obtain a reflected sensing signal. When any optical capturing module 80 is to be tested, a test operator plugs the testing unit 93 to different positioning holes 94 in a specific order so that the optical capturing module 80 obtains reflected sensing signal in different testing positions. Therefore, by checking whether all testing points displayed on testing software have bright values all above a predetermined value, it is known whether the optical capturing module 80 is able to capture reflected images in all positions. However, in the prior art, different positioning holes 94 need to be tested and measured for their sensing signals separately. It means that the test operator needs to carefully plug the testing unit 93 repeatedly in different positioning holes 94, removes the testing unit 93 and move the testing unit 93 to next positioning hole 94. Such approach is not only complicated but also increase testing time and therefore causes unnecessary cost. Moreover, only limited sampled positions are tested instead of a complete testing covering all possible touching positions.

Therefore, there is a need to develop a new testing device, a detection system and an automatic detection method to cure the deficiency in conventional art.

SUMMARY OF THE INVENTION

A major objective of the present invention is to provide a testing device which uses a track to achieve the testing purpose.

Another major objective of the present invention is to provide a detection system that has a testing device.

Another major objective of the present invention is an automatic detection method.

To achieve the aforementioned objective, the testing device is used for testing an optical capturing module. The testing device includes a base, a fixing unit, a testing unit and a track. The fixing unit is installed on the base for mounting the optical capturing module. The testing unit is used for the optical capturing module to obtain an image of the testing unit to generate a sensing signal thereof. The track is disposed on the base for the testing unit to move continuously along the track. When the testing unit is moved continuously along the track, the optical capturing module obtains a continuous sensing signal curve according to continuous moving positions of the testing unit.

The detection system is used for testing the optical capturing module. The detection system includes a control module and a testing device. The control module is electrically connected to the optical capturing module. The testing device includes a base, a fixing unit, a testing unit and a track. The fixing unit is disposed on the base for mounting the optical capturing module. The testing unit is used for the optical capturing module to capture images of the testing unit to generate sensing signals thereof. The track is disposed on the base for the testing unit to move continuously along the track. When the testing unit is moved continuously along the track, the topical capturing module obtains a continuous testing signal curve and the control module determines whether the sensing signal curve is exceed a predetermined value.

The automatic detection method of the present invention is used for testing an optical capturing module. The method includes the following steps: providing a base with a fixing unit so as the fixing unit holding the optical capturing module; providing a track on the base for a testing unit to move thereon continuously; the optical capturing module obtains a continuous sensing signal curve according to a continuous movement of the testing unit on the track; determining whether each point of the continuous sensing curve is exceed a predetermined value; and if not, determining the optical capturing module is in an abnormal status.

DETAILED DESCRIPTION OF THE PREFERRED EMBODIMENTS

The advantages and innovative features of the invention will become more apparent from the following detailed description when taken in conjunction with the accompanying drawings.

Figure 2:
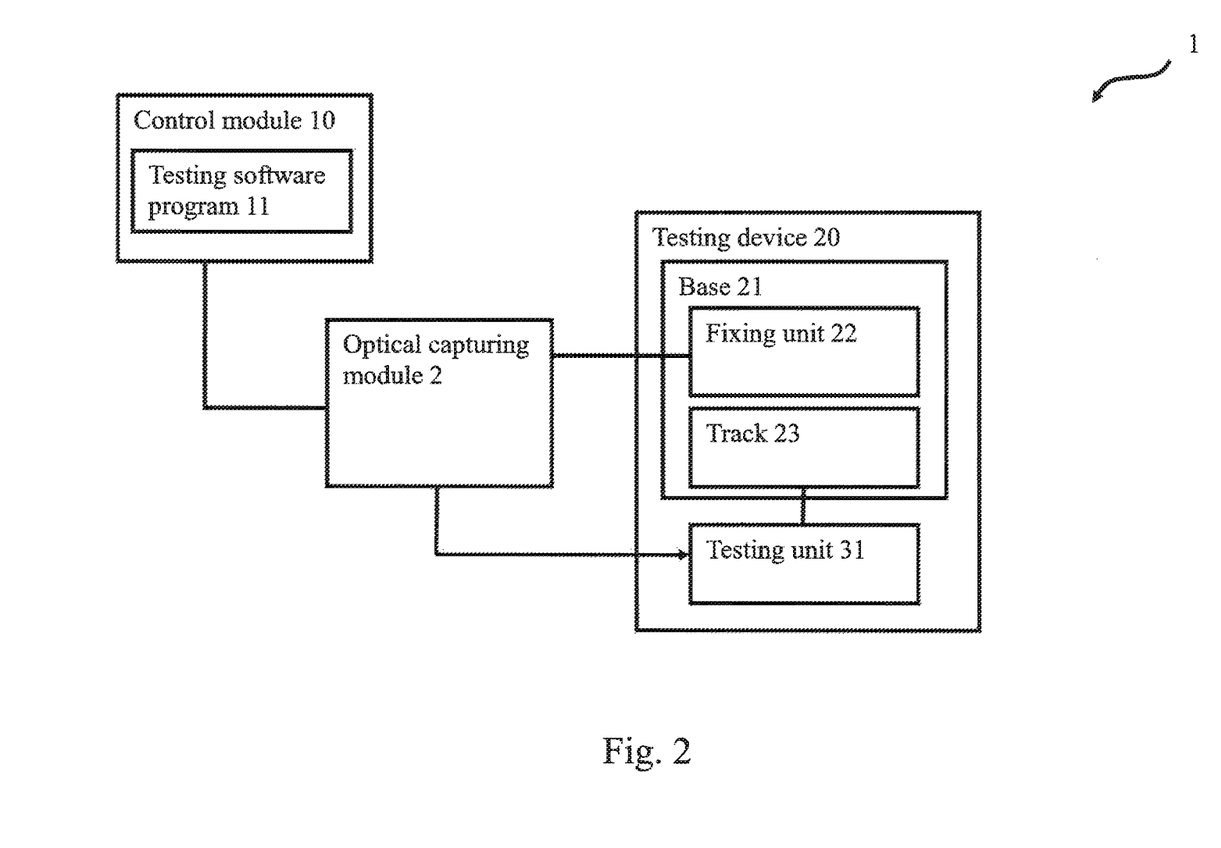
FIG. 2 is a structure diagram of a detection system of the present invention.

Please refer to FIG. 2, which is a structure diagram of a detection system of the present invention.

The detection system 1 of the present invention is used for testing an optical capturing module 2. The optical capturing module 2 may be used in an optical touching system (now shown) but the present invention is not limited to any specific usage of the optical capturing module 2. The detection system 1 includes a control module 10 and a testing device 20. The control module 10 may be composed of hardware, software or hardware combined with software, may be a computer with a processor, an input device, a display device, a memory device and a testing software program 11, or may be a portion of a computer, but the present invention is not limited to such implementations. The control module 10 is electrically connected to an optical capturing module 2 for processing a sensing signal obtained by the optical capturing module 2 to further determine whether the sensing signal is normal. There will be further detailed explanation on the automatic detection method in latter portion of this disclosure and thus it is not repeated here again.

Figure 4:
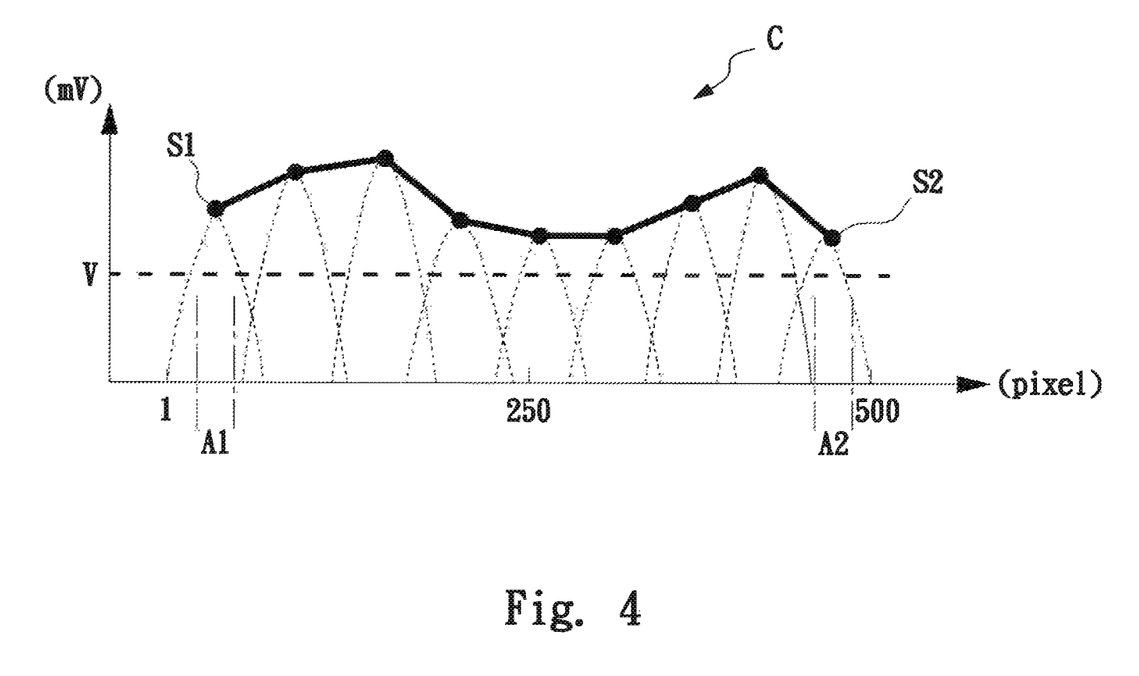
FIG. 4 is a sensing signal curve diagram obtained by the detection system of the present invention.

The testing device 20 has a base 21, a fixing unit 22, a track 23 and a testing unit 31, where the fixing unit 22 and the track 23 are disposed on the base 21. The fixing unit 22 is used for mounting the optical capturing module 2 so that the optical capturing module 2 may be fixed to face to a specific angle. The testing unit 31 is sliding along the track 23 by a tester or by automatic testing equipment. The track 23 is disposed on the lateral side of the base 21 so as to represent the farthest position to be captured in future use on a touch panel for the optical capturing module 2. As such, the optical capturing module 2 may obtain images of the continuously testing unit 31 to generate sensing signals thereof continuously. With the testing software program 11, a testing signal curve C (as shown in FIG. 4) is obtained and shown. The control module 10 then determines whether the optical capturing module 2 is normal according to the sensing signal curve C.

Figure 3A:
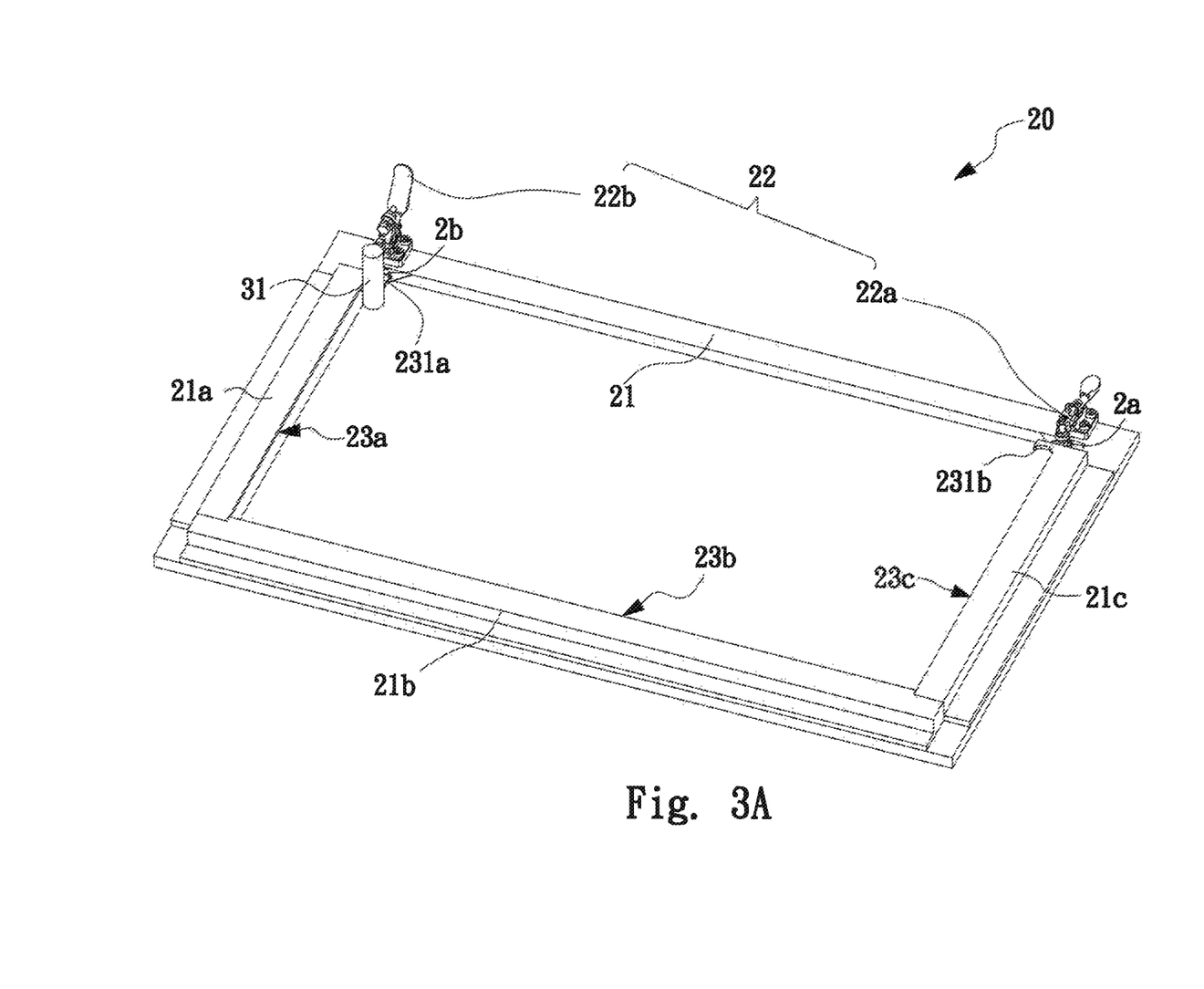
FIG. 3A is a three dimensional appearance diagram of the testing device of the present invention.
Figure 3B:
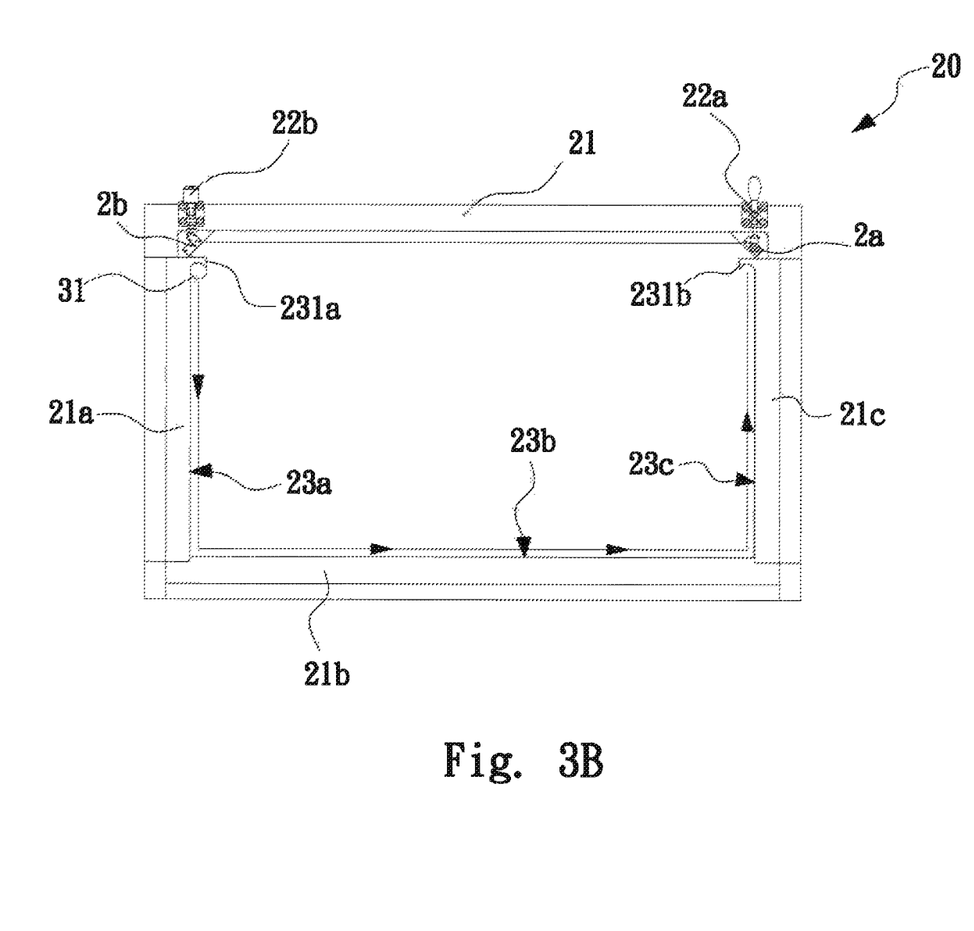
FIG. 3B is a top view for the appearance of the testing device of the present invention.

One of implementation structure of the testing device 20 is illustrated in FIG. 3A, which is a three dimensional diagram of a testing device of the present invention and FIG. 3B is a top view for the appearance of the testing device of the present invention.

In one embodiment, the testing device 20 may include a base 21, a first fixing unit 22a, a second fixing unit 22b, a track 23a, a second track 23b and a third track 23c. The base 21 may be a rectangle shape with four sides and its size is corresponding to the size of a touching panel the optical capturing module 2 is to be installed. However, the present invention is not limited to only such configuration and the base 21 may be designed to other different shapes. The base 21 may also be disposed with a smooth glass board or an acrylic board to increase smoothness so as decrease errors during capturing images. The first fixing unit 22a and the second fixing unit 22b are located in two corresponding corners on an upper lateral side of the base 21 for separately mounting a first optical capturing module 2a and a second optical capturing module 2b. In the present embodiment, the first fixing unit 22a and the second fixing unit 22b mount the first optical capturing module 2a and the second optical capturing module 2b by clapping so that the first optical capturing module 2a and the second optical capturing module 2b are fixed to face a specific angle, instead of moving freely, But the first fixing unit 22a and the second fixing unit 22b may also use screw fixing or other methods to perform mounting and the present invention is not limited to such exemplified configurations.

The inner lateral sides of the left side, bottom side and right side of the base 21 are disposed with a first side bar 21a, a second side bar 21b and a third side bar 21c so as forming in the inner lateral side of each side bar a first track 23a, a second track 23b and a third track 23c limiting moving traces of an object. Moreover, two ends of the second side bar 21b are connected to one sides of the first side bar 21a and the third side bar 21c so that the three side bars are connected and shaping an U shape moving path for the testing unit 31 to slide thereon. The testing unit 31 may be made as a cylinder body with plastic material and painting material that provides reflecting ratio near that of fingers is applied thereon to simulate touching of fingers. In addition, the ends of the first side bar 21 and the third side bar 21c that are neighboring to the first optical capturing module 2a and the second optical capturing module 2b are disposed with a stopping blocks 231a and a stopping blocks 231b as beginning points for the testing unit 31 to move.

Taking the example of FIG. 3A, when the first optical capturing module 2a is to be tested, a test operator may continuously move and slide the testing unit 31 from the stopping block 231 of the beginning point of the first track 23a to the intersected position of the second track 23b and the third track 23c so that the first optical capturing module 2a obtains a continuous first sensing signal curve. On the other hand, when the second optical capturing module 2b is to be tested, the testing unit 31 is moved from the stopping block 231b of the beginning point of the third track 23c to the intersected position of the second track 23b and the first track 23a so that the second optical capturing module 2b obtains a continuous second sensing signal curve. The testing software program 11 of the control module 10 then separately analyze the first sensing signal curve and the second sensing signal curve to ensure whether the first optical capturing module 2 or the second optical capturing module 2b function normally.

Next, please refer to FIG. 4, which illustrate a sensing signal curve diagram obtained and shown on the testing software program 11 by the detection system of the present invention.

As illustrated in FIG. 4, the control module 10 determines whether each sensing signal is above a predetermined value V according to the sensing signal curve C obtained by the first optical capturing module 2a or the second optical capturing module 2b. If they are all exceeding the predetermined value V, it means the first optical capturing module 2a or the second optical capturing module 2b is able to obtain the reflecting image signal of the testing unit 31 normally. If there are some sensing signals below the predetermined value V, it means the quality of the first optical capturing module 2a or the second optical capturing module 2b is not good.

On the other hand, the control module 10 also determines whether a starting sensing signal S1 captured firstly and a final sensing signal S2 captured lastly are separately falling within a first predetermined range A1 and a second predetermined range A2 to determine whether structure assembly of the first optical capturing module 2a or the second optical capturing module 2b is normal. For example, if the first optical capturing module 2a or the second optical capturing module 2b may obtain a range between one pixel to 500 pixels, the staring sensing signal S1 should be near the position of one pixel and the final sensing signal S2 should be near the position of 500 pixels. However, the present invention is not limited to these exemplified values. In FIG. 4, it is known that the first predetermined range A1 may be set as a range near one pixel but does not need to be limited to include one pixel. Similarly, the second predetermined range A2 may be set as a range near 500 pixels but does not need to be limited to include 500 pixels. If the first optical capturing module 2a or the second optical capturing module 2b has abnormal structure assembly, e.g. a lens being assembled obliquely, the staring sensing signal or the final sensing signal will be over the first predetermined range A1 and the second predetermined range A2. Therefore, the control module 10 may determine whether the first optical capturing module 2a or the second optical capturing module 2b is assembled normally.

Figure 5:
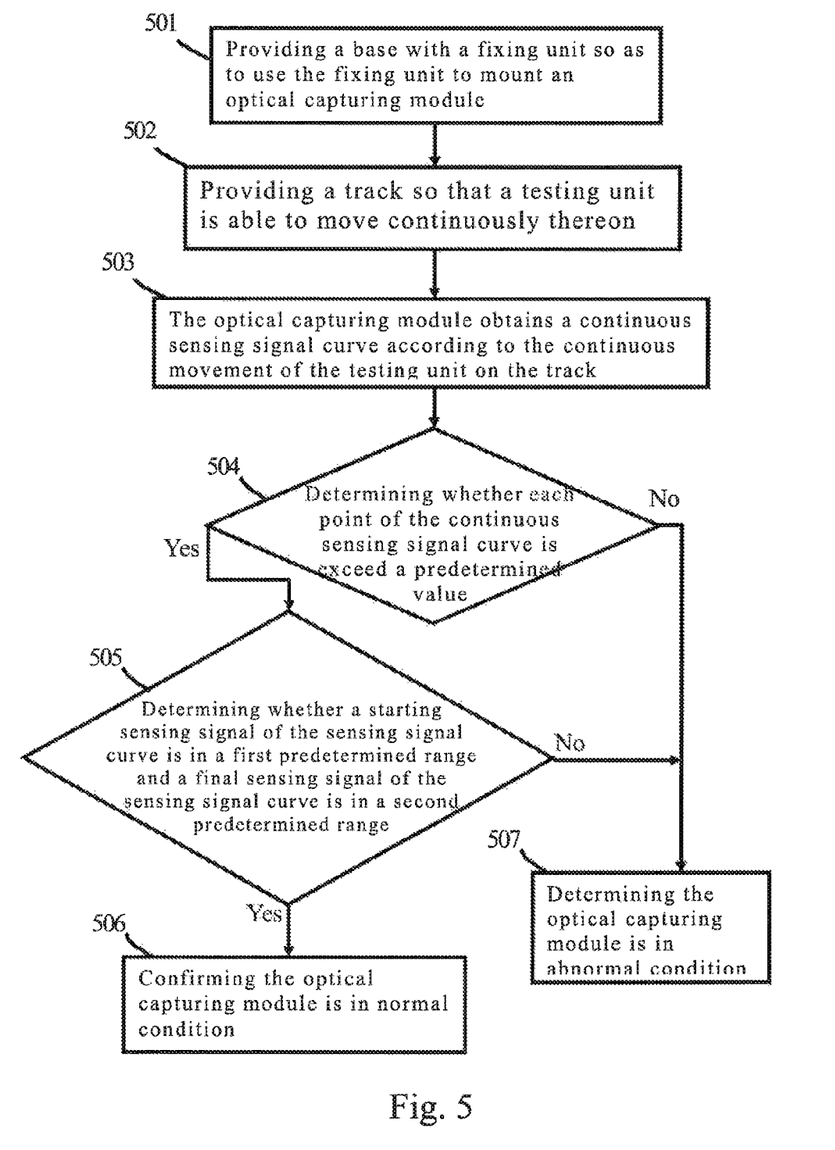
FIG. 5 is a flowchart of an automatic detection method of the present invention.

Next, please refer to FIG. 5, which is a flowchart illustrating an automatic detection method of the present invention. It is to be noted that although the following disclosure uses the aforementioned the detection system 1 of the testing device 20 as an example to explain the automatic detection method of the present invention, the automatic detection method of the present invention is not only limited to be used on the testing device 20 or the detection system 1.

First, the method goes to step 501: providing a base with a fixing unit so as to use the fixing unit to mount an optical capturing module.

When at beginning the detection system 1 is used to test the optical capturing module 2, a base with a fixing unit 22 is provided to mount the optical capturing module 2 with the fixing unit 22. In one embodiment of the present invention, the first fixing unit 22a and the second fixing unit 22b are used for separately clapping and holding the first optical capturing module 2a and the second optical capturing module 2b, but the present invention is not limited to only such configuration.

Next, the method goes to step 502: providing a track so that a testing unit is able to move continuously thereon.

Next, the testing device 20 provides the testing unit 31 to be moved continuously on two connected tracks 23, e.g. continuously moving from the stopping block 231 of the first track 23a to the intersected position of the second track 23b and the third track 23c, or continuously moving from the stopping block 231b of the third track 23c to the intersected position of the second track 23b and the first track 23a.

Next, the method goes to step 503: the optical capturing module obtains a continuous sensing signal curve according to the continuous movement of the testing unit on the track.

Next, the optical capturing module 2 performs reflection image capturing for the continuous moving testing unit 31 to obtain a continuous sensing signal curve. That is, the first optical capturing module 2a captures a continuous first sensing signal curve according to the movement of the testing unit 31 from the first track 23a to the second track 23b, and the second optical capturing module 2b captures a continuous second sensing signal curve according to the movement of the testing unit 31 from the third tack 23c to the second track 23b.

Next, the method goes to step 504: determining whether each point of the continuous sensing signal curve is exceed a predetermined value.

After the optical capturing module 2 obtains the continuous sensing signal curve C, the control module 10 determines whether the continuous sensing signal curve C is exceed a predetermined value V in all places.

If all places of the continuous sensing signal curve C are all over a predetermined value V, the control module 10 then further performs the step 505: determining whether a starting sensing signal of the sensing signal curve is in a first predetermined range and a final sensing signal of the sensing signal curve is in a second predetermined range.

The control module 10 further determines whether the starting sensing signal S1 of the continuous sensing signal curve C is within a first predetermined range A1 and the final sensing signal S2 is within a second predetermined range A2.

If yes, then the method goes to step 506: confirming the optical capturing module is in normal condition.

When each point of the continuous sensing signal curve C is exceed the predetermined value V, the starting sensing signal S1 is within the first predetermined range A1 and the final sensing signal S2 is within the second predetermined range A2, the control module 10 may confirm the optical capturing module 2 which is tested is in normal condition.

If any result in the step 504 or the step 505 is over the standard, the method goes to step 507: determining the optical capturing module is in abnormal condition.

When any position of the continuous sensing signal curve C is not over the predetermined value V, or the starting sensing signal S1 is not within the first predetermined range A1, or the final sensing signal S2 is not within the second predetermined range A2, the control module 10 may determine that that the optical capturing module 2 is in abnormal condition.

It is to be noted that the automatic detection method is not limited by the order as described above. Any sequence of these steps may be used if it can achieve the objectives of the present invention.

With the testing device 20 as mentioned above, the function of the optical capturing module 2 can be tested whether it is in normal condition quickly. A test operator need to not plug the testing unit repeatedly to different positioning holes, take the testing unit out and move the testing unit to next positioning hole. What the test operator needs to do is to smoothly follow the continuous track to test the testing unit. As such the whole testing operation is simplified and testing time is decreased to save unnecessary labor force and time cost. Moreover, a continuous and complete testing is performed at the same time and covers testing on all possible touching positions.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A testing device for testing an optical capturing module, the testing device comprising:
   a base;
   a fixing unit disposed on the base for mounting the optical capturing module;
   a testing unit for the optical capturing module to capture an image of the testing unit to generate a sensing signal thereof; and
   a track disposed on the base for the testing unit to move along the track continuously, wherein when the testing unit is moving, continuously on the track, the optical capturing module obtains a continuous sensing signal curve according to continuous moving positions of the testing unit, such that the optical capturing module can be determined whether is in an abnormal status by determining whether the sensing signal curve is exceed a predetermined value.

2. The testing device as claimed in claim 1, wherein the fixing unit comprises a first fixing unit and a second fixing unit separately located at two corners of a lateral side of the base for holding a first optical capturing module and a second optical capturing module.

3. The testing device as claimed in claim 2, wherein connected side bars are disposed on the lateral sides of the base other than said lateral side so as forming the track that provides the testing unit to move in inner sides of the side bars.

4. The testing device as claimed in claim 3, wherein the base is a rectangle shape with four lateral sides, the first optical capturing module and the second optical capturing module are fixed in the two corners of an upper side, and a left side, a bottom side and a right side of the base are disposed with a first side bar, a second side bar and a third side bar so as forming a first track, a second track and a third track in an inner lateral side of each of the side bars.

5. The testing device as claimed in claim 4, wherein:
when the testing unit is moved from the first track to the second track, the first optical capturing module obtains a continuous first sensing signal curve according to the movement of the testing unit; and
when the testing unit is moved from the third track to the second track, the second optical capturing module obtains a continuous second sensing signal curve according the movement of the testing unit.

6. The testing device as claimed in claim 1, wherein one end of the track further comprises a stopping block as a beginning point for the testing unit to move.

7. A detection system for testing an optical capturing module, the detection system comprising:
a control module electrically connected to the optical capturing module;
a testing device, comprising:
a base;
a fixing unit disposed on the base for mounting the optical capturing module;
a testing unit for the optical capturing module to capture an image of the testing unit to generate a sensing signal thereof; and
a track disposed on the based for the testing unit to move along the track continuously;
wherein when the testing unit is moved on the track continuously, the optical capturing module obtains a continuous sensing signal curve according to continuous moving points of the testing unit, and the control module determines whether the sensing signal curve is exceed a predetermined value so as to determine whether the optical capturing module is in an abnormal status.

8. The detection system as claimed in claim 7, wherein the control module further determines whether a starting signal of the sensing signal curve is in a first predetermined range and determines whether a final sensing signal is in a second predetermined range.

9. The detection system as claimed in claim 7, wherein the fixing unit comprises a first fixing unit and a second fixing unit separately located at two corresponding corners of a lateral side of the base for separately holding a first optical capturing module and a second optical capturing module.

10. The detection system as claimed in claim 9, wherein the other lateral sides of base other than said lateral sides are disposed with connected side bars so as forming the track that provides the testing unit to move in inner sides of the side bars.

11. The detection system as claimed in claim 10, wherein the base is a rectangle shape with four lateral sides, the optical capturing module and the second optical capturing module are fixed in two corners of an upper side, and a left side, a bottom side and a right side of the base are disposed with a first side bar, a second side bar and a third side bar so as forming a first track, a second track and a third track connected together in an inner lateral side of each of the side bars.

12. The detection system as claimed in claim 11, wherein:
when the testing unit is moved from the first track to the second track, the first optical capturing module obtains a continuous first sensing signal curve according to the movement of the testing unit; and
when the testing module is moved from the third track to the second track, the second optical capturing module obtains a second sensing signal curve according to the movement of the testing unit.

13. The detection system as claimed in claim 12, wherein one end of the track further comprises a stopping block as a starting point for the testing unit to move.

14. An automatic detection method to be used in a detection system for testing an optical capturing module, the method comprising:
providing a base with a fixing unit so as the fixing unit holding the optical capturing module;
providing a track on the base for a testing unit to move thereon continuously;
the optical capturing module obtains a continuous sensing signal curve according to a continuous movement of the testing unit on the track;
determining whether each point of the continuous sensing curve is exceed a predetermined value by a control module; and
if not, determining the optical capturing module is in an abnormal status by the control module.

15. The automatic detection method as claimed in claim 14, further comprising:
determining whether a starting sensing signal of the continuous sensing curve is in a first predetermined range and determining whether a final sensing signal of the continuous sensing curve is in a second predetermined range by the control module; and
if not, determining the optical capturing module is in an abnormal status by the control module.

16. The automatic detection method as claimed in claim 14, further comprising:
providing a first fixing unit and a second fixing unit disposed in two corresponding corners of a lateral side of the base for separately holding a first optical capturing module and a second optical capturing module.

17. The automatic detection method as claimed in claim 16, further comprising installing connected side bars in other lateral sides of the base other than said lateral side so as forming the track for the testing unit to move in an inner lateral side of the side bars.

18. The automatic detection method as claimed in claim 17, further comprising:
providing the base as being a rectangle shape with four lateral sides and mounting the first optical capturing module and the second optical capturing module at two corners of an upper side, and a left side, a bottom side and a right side of the base are disposed with a first side bar, a second side bar and a third side bar in an inner lateral side of each side bar.

19. The automatic detection method as claimed in claim 18, further comprising:
when the testing unit moving from the first track to the second track, providing the first optical capturing module to obtain a continuous first sensing signal curve according to the movement of the testing unit; and
when the testing unit moving from the third track to the second track, providing the second optical capturing module to obtain a continuous second sensing signal curve according to the movement of the testing unit.

20. The automatic detection method as claimed in claim 14, further comprising disposing a stopping block in one end of the track as a starting point for the testing unit to move.

* * * * *